(12) United States Patent
Yamasaki et al.

(10) Patent No.: US 9,590,729 B2
(45) Date of Patent: Mar. 7, 2017

(54) VISIBLE LIGHT COMMUNICATION SYSTEM

(71) Applicant: Panasonic Intellectual Property Management Co., Ltd., Osaka (JP)

(72) Inventors: Shigeaki Yamasaki, Osaka (JP); Shojirou Kido, Osaka (JP); Yosuke Kondo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/442,789

(22) PCT Filed: Nov. 1, 2013

(86) PCT No.: PCT/JP2013/006478
§ 371 (c)(1),
(2) Date: May 14, 2015

(87) PCT Pub. No.: WO2014/076901
PCT Pub. Date: May 22, 2014

(65) Prior Publication Data
US 2015/0304029 A1    Oct. 22, 2015

(30) Foreign Application Priority Data
Nov. 16, 2012   (JP) ................. 2012-252561

(51) Int. Cl.
*H04B 10/116* (2013.01)
*H04L 7/00* (2006.01)
*H04B 10/11* (2013.01)

(52) U.S. Cl.
CPC ............... *H04B 10/116* (2013.01)

(58) Field of Classification Search
CPC ............ H04B 10/116; H04B 10/1141
(Continued)

(56) References Cited

U.S. PATENT DOCUMENTS 9,319,134 B2 * 4/2016 Walewski .......... H04B 10/1141
2002/0093987 A1 * 7/2002 Hirota .................. H04J 3/0605
370/503

(Continued)

FOREIGN PATENT DOCUMENTS

JP    2004-072365 A    3/2004
JP    2009-206598 A    9/2009

(Continued)

OTHER PUBLICATIONS

International Search Report for corresponding International Application No. PCT/JP2013/006478 mailed Dec. 3, 2013.

(Continued)

*Primary Examiner* — Oommen Jacob
(74) *Attorney, Agent, or Firm* — Renner, Otto, Boisselle & Sklar, LLP

(57) ABSTRACT

A controller is configured, by decreasing light quantity in only a first slot that is any one of a plurality of slots into which a unit time is divided equally, and increasing light quantity in all the remaining slots except the first slot of the plurality of slots, to assign information to the first slot of the plurality of slots. The controller is furthermore configured to decrease light quantity in second slots that are three or more continuous slots starting from a head of a preamble, which indicates a frame start point, of a frame of an optical-communication signal and to increase light quantity in a slot immediately before the preamble.

5 Claims, 4 Drawing Sheets

(58) Field of Classification Search
USPC .......................................... 398/118, 116, 115
See application file for complete search history.

(56) References Cited

U.S. PATENT DOCUMENTS

| | | | | |
|---|---|---|---|---|
| 2004/0247323 | A1* | 12/2004 | Morioka | H04B 10/1141 398/140 |
| 2006/0239689 | A1* | 10/2006 | Ashdown | H04B 10/1141 398/130 |
| 2007/0058987 | A1* | 3/2007 | Suzuki | H04B 10/116 398/183 |
| 2010/0166016 | A1* | 7/2010 | Moss | H04L 7/041 370/474 |
| 2010/0316389 | A1* | 12/2010 | Walewski | H04B 10/1141 398/130 |
| 2012/0051757 | A1 | 3/2012 | Nishino et al. | |
| 2014/0341589 | A1* | 11/2014 | Schmid | H04B 10/116 398/131 |
| 2015/0304029 | A1* | 10/2015 | Yamasaki | H04B 10/116 398/118 |

FOREIGN PATENT DOCUMENTS

| | | |
|---|---|---|
| JP | 2010-041476 A | 2/2010 |
| JP | 2011-514765 A | 5/2011 |
| JP | 2012-069505 A | 4/2012 |
| WO | WO 01/19004 A1 | 3/2001 |

OTHER PUBLICATIONS

Form PCT/ISA/237 for corresponding International Application No. PCT/JP2013/006478 dated Dec. 3, 2013.

\* cited by examiner

FIG. 3

(LSB)                                                                                 (MSB)

| 1 | 1 | 0 | 0 | 0 | 0 | 0 | 0 | 0 | 1 | 0 | 0 |
|---|---|---|---|---|---|---|---|---|---|---|---|
| 1 | 1 | 0 | 0 | 0 | 0 | 0 | 0 | 0 | 0 | 1 | 0 |
| 1 | 1 | 0 | 0 | 0 | 0 | 0 | 0 | 0 | 0 | 0 | 1 |
| 1 | 0 | 1 | 0 | 0 | 0 | 0 | 0 | 0 | 0 | 1 | 0 |
| 1 | 0 | 1 | 0 | 0 | 0 | 0 | 0 | 0 | 0 | 0 | 1 |
| 1 | 0 | 0 | 1 | 0 | 0 | 0 | 0 | 0 | 0 | 0 | 1 |
| 1 | 0 | 0 | 0 | 0 | 0 | 0 | 0 | 1 | 1 | 0 | 0 |
| 1 | 0 | 0 | 0 | 0 | 0 | 0 | 0 | 1 | 0 | 1 | 0 |
| 1 | 0 | 0 | 0 | 0 | 0 | 0 | 0 | 1 | 0 | 0 | 1 |
| 1 | 0 | 0 | 0 | 0 | 0 | 0 | 0 | 0 | 1 | 1 | 0 |
| 1 | 0 | 0 | 0 | 0 | 0 | 0 | 0 | 0 | 1 | 0 | 1 |
| 1 | 0 | 0 | 0 | 0 | 0 | 0 | 0 | 0 | 0 | 1 | 1 |
| 0 | 1 | 1 | 0 | 0 | 0 | 0 | 0 | 0 | 0 | 1 | 0 |
| 0 | 1 | 1 | 0 | 0 | 0 | 0 | 0 | 0 | 0 | 0 | 1 |
| 0 | 1 | 0 | 1 | 0 | 0 | 0 | 0 | 0 | 0 | 0 | 1 |
| 0 | 1 | 0 | 0 | 0 | 0 | 0 | 0 | 0 | 1 | 1 | 0 |
| 0 | 1 | 0 | 0 | 0 | 0 | 0 | 0 | 0 | 1 | 0 | 1 |
| 0 | 1 | 0 | 0 | 0 | 0 | 0 | 0 | 0 | 0 | 1 | 1 |
| 0 | 0 | 1 | 1 | 0 | 0 | 0 | 0 | 0 | 0 | 0 | 1 |
| 0 | 0 | 1 | 0 | 0 | 0 | 0 | 0 | 0 | 0 | 1 | 1 |

PREAMBLES (LSB) (MSB)

| 1 | 0 | 0 | 0 | 0 | 0 | 0 | 0 | 0 | 1 |

PREAMBLE (LSB) (MSB)

| 1 | 0 | 1 | 0 | 0 | 0 | 0 | 0 | 0 | 0 | 0 | 0 | 0 | 1 | 0 |
| 1 | 0 | 1 | 0 | 0 | 0 | 0 | 0 | 0 | 0 | 0 | 0 | 0 | 0 | 1 |
| 1 | 0 | 0 | 1 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 1 | 0 | 1 | 0 |
| 1 | 0 | 0 | 0 | 0 | 0 | 0 | 0 | 0 | 0 | 0 | 1 | 0 | 0 | 1 |
| 1 | 0 | 0 | 0 | 0 | 0 | 0 | 0 | 0 | 0 | 0 | 0 | 1 | 0 | 1 |
| 0 | 1 | 0 | 1 | 0 | 0 | 0 | 0 | 0 | 0 | 0 | 0 | 0 | 0 | 1 |
| 0 | 1 | 0 | 0 | 0 | 0 | 0 | 0 | 0 | 0 | 0 | 0 | 1 | 0 | 1 |

PREAMBLES

VISIBLE LIGHT COMMUNICATION SYSTEM

TECHNICAL FIELD

The present invention relates to a visible light communication system that uses visible light as a communication medium.

BACKGROUND ART

In recent years, a visible light communication system (visible light ID system) is put in practice use, which is configured to modulate visible light (illumination light) emitted from a luminaire (transmitter), to transmit unique ID information and the like to the luminaire, and demodulate the ID information with a receiver that receives the visible light.

Here, a visible light communication apparatus described in JP 2012-69505 A (referred to as "document 1") is illustrated as a conventional example of the transmitter that constitutes the visible light communication system. As showed in FIG. 7, this visible light communication apparatus 10 includes a constant current source 1, a smoothing capacitor 2, an LED source 3, a load change element 4, a signal generating circuit 6, and a switch element 5.

The smoothing capacitor 2 is connected between output ends of the constant current source 1 and is configured to smooth an output of the constant current source 1. The LED source 3 includes a plurality of light emitting diodes connected in series between the output ends of the constant current source 1, and the output of the constant current source 1, which is smoothed by the smoothing capacitor 2, is supplied. The load change element 4 is for partially changing load characteristic of the LED source 3 by being added to the LED source 3. For example, the load change element 4 includes a resistor connected in parallel to a part of the plurality of light emitting diodes. The signal generating circuit 6 is configured to generate an optical-communication signal of a binary. The switch element 5 includes a switching element (for example, a MOSFET) connected in series with the resistor that constitutes the load change element 4, for example. It is switched whether the switch element 5 is configured to switch whether or not the load change element 4 is added to the LED source 3 by switching ON/OFF by the optical-communications signal of a binary.

That is, the size of a load current that flows through the light emitting diodes in a time period when the load change element 4 is not added to the LED source 3 is different from that of a time period when the load change element 4 is added to the LED source 3, and therefore, the optical-communication signal can be superimposed on the light quantity of the visible light communication apparatus 10 and be transmitted.

The optical-communication signal transmitted from the visible light communication apparatus 10 is received by a receiver 20 that includes a photo IC. The receiver 20 adopts the system of receiving the optical-communication signal by determining the difference between an optical output on which the optical-communication signal is not superimposed and an optical output on which the optical-communication signal is superimposed. By adopting the above system, it is possible to detect modulated light even if the modulated light is small.

Incidentally, a specification (protocol) of the visible light communication is specified to Japan Electronics and Information Technology Industries Association standard JEITA CP-1222 (visible light ID system), for example. In this standard, send data is converted to a pulse position each unit that includes two bits. Such a conversion (coding) system is called 4 PPM (pulse position modulation). In the 4 PPM coding, the signal generating circuit 6 turns on the switch element 5 to increase the optical output (light on) when a slot is set to "0". The signal generating circuit 6 turns off the switch element 5 to decrease the optical output (or light off) when a slot is set to "1" (refer to FIG. 2).

Here, in the above-mentioned standard, a pattern of three slots that are assigned with "1" continuously and nine slots that are assigned with "0" continuously ("111000000000") is used as a preamble for specifying a starting position of a frame (refer to FIG. 8). The pattern does not occur even if the 4 PPM coding is adopted to the data. When a fourth slot of the data transmitted immediately before the preamble is assigned with "1", four slots assigned with "1" are continuously constituted of the fourth slot and the three continuous slots assigned with "1" starting from a head of the preamble. Because the data speed in the above-mentioned standard is 4.8 kilobits per second, the time period for one slot is 104.2 µs, and the time period for the four slots is 416.7 µs that is nearly equal to 104.2×4.

Then, because the discharging amount of the electric charge charged in the smoothing capacitor 2 increases when the continuous off period of the switch element 5 is extended to the time period for the four slots, a waveform of the load current may be disturbed largely when a change to "0" from "1" of the last is performed (refer to a time period T in FIG. 9). Thus, when the waveform of the load current is disturbed largely, there is a possibility that the optical-communication signal is not modulated correctly and then a communication error occurs. It is not desirable that the electrostatic capacitance of the smoothing capacitor 2 is enlarged in order to solve such a problem because the dimension of the smoothing capacitor 2 enlarges and the component cost of the smoothing capacitor 2 rises.

SUMMARY OF INVENTION

The present invention has been made in the light of the above-described problem, and an object of the present invention is to suppress disturbance of a waveform of a current that flows through a light source in addition to suppression of a cost rise and the like.

A visible light communication system according to an aspect of the present invention includes a transmitter and a receiver. The visible light communication system is configured to transmit an optical-communication signal from the transmitter to the receiver with visible light as a communication medium. The transmitter includes: a light source configured to emit the visible light; a lighting circuit configured to supply electric power to the light source to turn on the light source; and a controller configured to control the lighting circuit to increase/decrease light quantity of the visible light to be emitted by the light source. The controller is configured, by decreasing the light quantity in only a first slot that is any one of a plurality of slots into which a unit time is divided equally, and increasing the light quantity in all the remaining slots except the first slot of the plurality of slots, to assign information to the first slot of the plurality of slots. The controller is furthermore configured to decrease the light quantity in second slots that are three or more continuous slots starting from a head of a preamble, which indicates a frame start point, of a frame of the optical-communication signal and to increase the light quantity in a slot immediately before the preamble.

In the visible light communication system, the unit time is preferably a time period of one symbol including two bits in a data part except the preamble of the frame. The plurality of slots preferably includes four slots into which the time period of the one symbol is divided equally. The controller is preferably configured to assign two-bit data to the first slot of the four slots in which the time period of the one symbol is divided equally. Preferably, the controller is furthermore configured, while the preamble includes slots of which the number is equal to a product of four and an integer of three or more, to decrease the light quantity in the second slots of which the number is equal to the integer of three or more, to increase the light quantity in seven or more slots continuously, and not to set four or more of the second slots continuously.

A visible light communication system according to an aspect of the present invention includes a transmitter and a receiver. The visible light communication system is configured to transmit an optical-communication signal from the transmitter to the receiver with visible light as a communication medium. The transmitter includes: a light source configured to emit the visible light; a lighting circuit configured to supply electric power to the light source to turn on the light source; and a controller configured to control the lighting circuit to increase/decrease light quantity of the visible light to be emitted by the light source. The controller is configured, by decreasing the light quantity in only a first slot that is any one of a plurality of slots into which a unit time is divided equally, and increasing the light quantity in all the remaining slots except the first slot of the plurality of slots, to assign information to the first slot of the plurality of slots. The controller is configured to assign two-bit data to the first slot of four slots into which a time period of one symbol is divided equally, in a data part except a preamble, which indicates a frame start point, of a frame of the optical-communication signal. The four slots are the plurality of slots. The one symbol includes two bits. The controller is furthermore configured, while the preamble includes slots of which the number is equal to a product of four and an integer of three or more, to decrease the light quantity in second slots of which the number is equal to the integer of three or more, to increase the light quantity in seven or more slots continuously, and not to set three or more of the second slots continuously.

A visible light communication system according to an aspect of the present invention includes a transmitter and a receiver. The visible light communication system is configured to transmit an optical-communication signal from the transmitter to the receiver with visible light as a communication medium. The transmitter includes: a light source configured to emit the visible light; a lighting circuit configured to supply electric power to the light source to turn on the light source; and a controller configured to control the lighting circuit to increase/decrease light quantity of the visible light to be emitted by the light source. The controller is configured, by decreasing the light quantity in only a first slot that is any one of a plurality of slots into which a unit time is divided equally, and increasing the light quantity in all the remaining slots except the first slot of the plurality of slots, to assign information to the first slot of the plurality of slots. The controller is configured to assign two-bit data to the first slot of four slots except a head slot or a tail slot of five slots into which a time period of one symbol is divided equally, in a data part except a preamble, which indicates a frame start point, of a frame of the optical-communication signal. The five slots are the plurality of slots. The one symbol includes two bits. The controller is furthermore configured, while the preamble includes slots of which the number is equal to a product of five and an integer of two or more, to decrease the light quantity in second slots of which the number is equal to the integer of two or more, to increase the light quantity in eight or more slots continuously, and not to set three or more of the second slots continuously.

A visible light communication system according to an aspect of the present invention includes a transmitter and a receiver. The visible light communication system is configured to transmit an optical-communication signal from the transmitter to the receiver with visible light as a communication medium. The transmitter includes: a light source configured to emit the visible light; a lighting circuit configured to supply electric power to the light source to turn on the light source; and a controller configured to control the lighting circuit to increase/decrease light quantity of the visible light to be emitted by the light source. The controller is configured, by decreasing the light quantity in only a first slot that is any one of a plurality of slots into which a unit time is divided equally, and increasing the light quantity in all the remaining slots except the first slot of the plurality of slots, to assign information to the first slot of the plurality of slots. The controller is configured to assign two-bit data to the first slot of four slots except a head slot or a tail slot of five slots into which a time period of one symbol is divided equally, in a data part except a preamble, which indicates a frame start point, of a frame of the optical-communication signal. The five slots are the plurality of slots. The one symbol includes two bits. The controller is furthermore configured, while the preamble includes slots of which the number is equal to a product of five and an integer of two or more, to decrease the light quantity in second slots of which the number is equal to the integer of two or more, to increase the light quantity in eight or more slots continuously, and not set the second slots continuously.

The visible light communication system according to each aspect of the present invention has an advantageous effective in that it is possible to suppress a disturbance of a waveform of a current that flows through the light source in addition to suppression of a cost rise and the like.

BRIEF DESCRIPTION OF DRAWINGS

FIG. 3 is an explanatory view for a preamble of a visible light communication system according to a second embodiment of the present invention;

DESCRIPTION OF EMBODIMENTS

Hereinafter, a visible light communication system according to each embodiment of the present invention will be described in detail with reference to drawings.

First Embodiment

Figure 7:
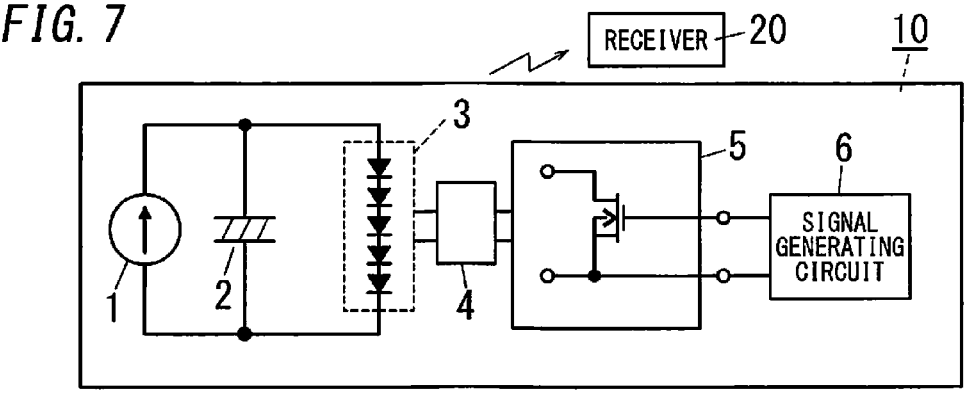
FIG. 7 is a block diagram showing a visible light communication system.
Figure 8:
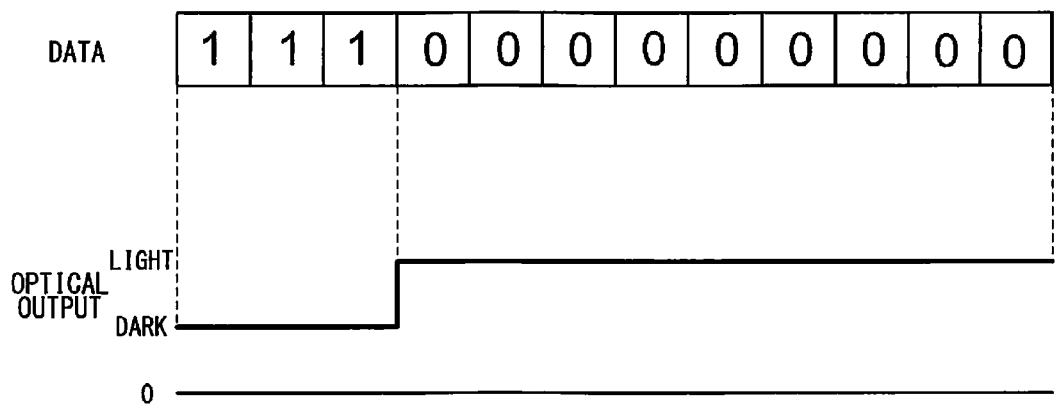
FIG. 8 is an explanatory view for a preamble of a conventional example.
Figure 9:
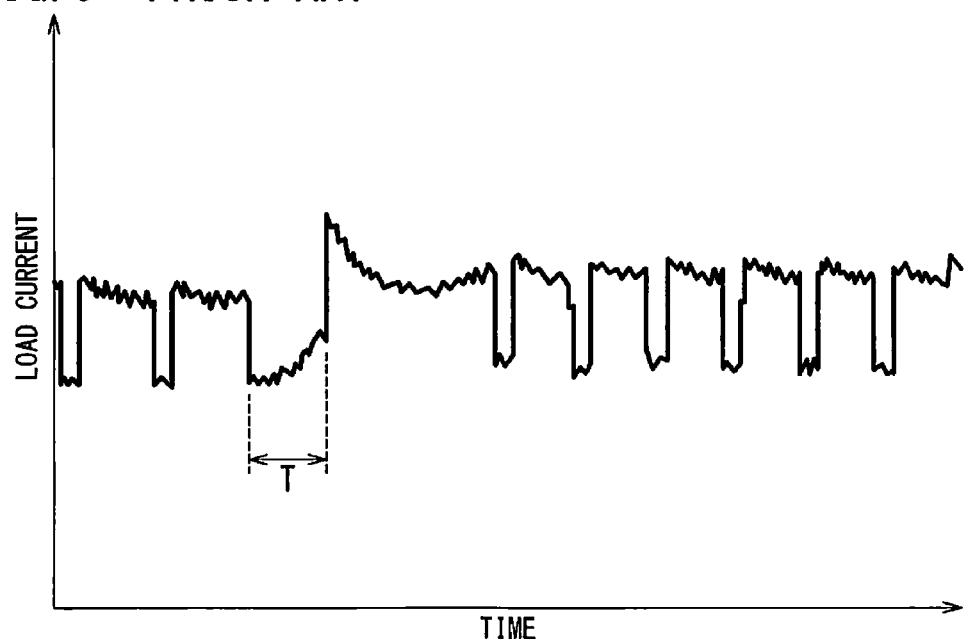
FIG. 9 is an explanatory view for a load current waveform of the conventional example.

As shown in FIG. 7, a visible light communication system according to the present embodiment includes a transmitter (visible light communication apparatus) 10 and a receiver 20, like the conventional example described in the document 1. Since the transmitter 10 of the present embodiment has the identical circuit configuration as the visible light communication apparatus of the conventional example, a detailed description thereof will be omitted. In the transmitter 10 of the present embodiment, a constant current source 1 and a smoothing capacitor 2 correspond to a lighting circuit. An LED source 3 corresponds to a light source. A load change element 4, a switch element 5, and a signal generating circuit 6 correspond to a controller.

Also in the present embodiment, a 4 PPM coding is performed to data based on Japan Electronic and Information Industrial Association standard JEITA CP-1222. That is, the controller (signal generating circuit 6) is configured, by decreasing light quantity in only any one (first slot) of four slots into which a unit time (symbol time) is divided equally, and increasing light quantity in the remaining three slots, assign information (data) to a position of the above-mentioned slot in which the light quantity is decreased. JEITA CP-1222 specifies that "1" is assigned to the slot in which the light quantity is decreased and "0" is assigned to the slot in which the light quantity is increased.

Here, as described in Background Art, when a fourth slot of the data transmitted immediately before the preamble is assigned with "1", four slots assigned with "1" are continuously constituted of the fourth slot and three continuous slots assigned with "1" starting from a head of the preamble. Then, since the discharging amount of the smoothing capacitor 2 is increased when the continuous off period of the switch element 5 is extended to a time period corresponding to four slots or more, a waveform of a load current may be disturbed largely when a change to "0" from "1" of the last occurs.

Figure 1A:
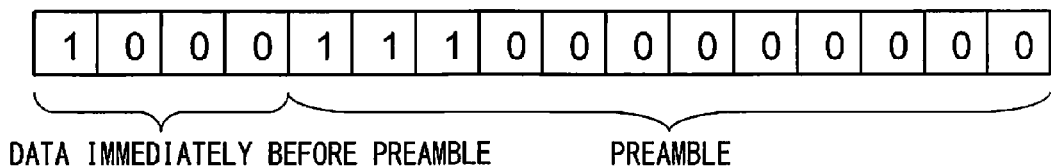
FIGS. 1A to 1D are explanatory views for a preamble of a visible light communication system according to a first embodiment of the present invention.
Figure 1B:
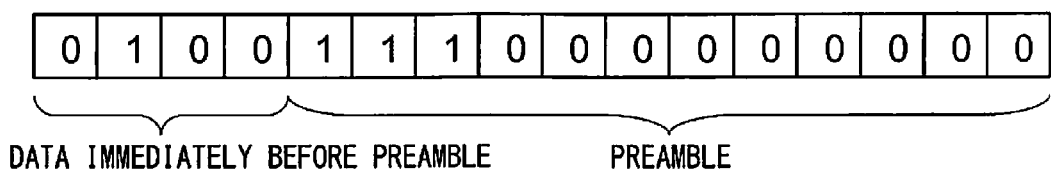
Figure 1C:
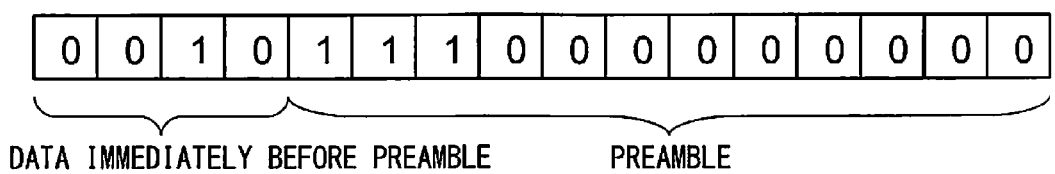
Figure 1D:
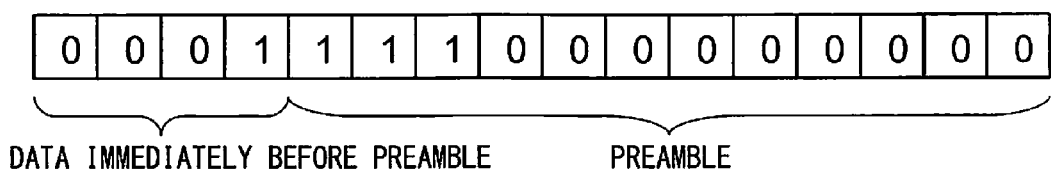
Figure 2:
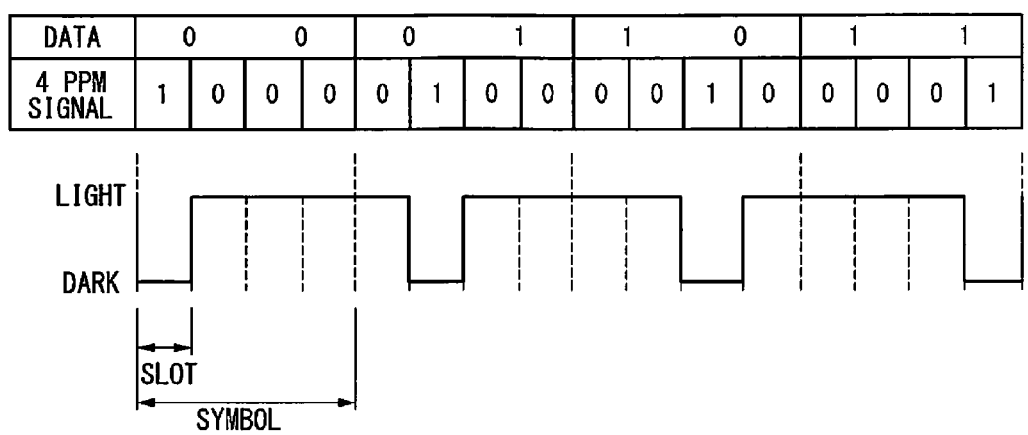
FIG. 2 is an explanatory view for a 4 PPM coding in the visible light communication system according to the first embodiment of the present invention.

In the present embodiment, the signal generating circuit 6 is configured to increase the light quantity in the slot immediately before the preamble. That is, the signal generating circuit 6 is configured to transmit, without changing, the data when the data of one symbol (two bits) transmitted immediately before the preamble is any one of "00", "01", and "10" (refer to FIGS. 1A to 1C). The signal generating circuit 6 is configured to insert dummy data when the data of the one symbol is "11". Since the length of the frame (frame length) except the preamble is specified in the standard, even if the dummy data is inserted, the receiver 20 has no influence in reception of the data by disregarding the dummy data. The dummy data is preferably any one of "00", "01", and "10".

In the case where the frame is transmitted continuously, the data immediately before the preamble depends on CRC (cyclic redundancy check) data of a previous frame, in detail, two-bit data on an MSB (most significant bit) side of the CRC data. Therefore, the value of a payload of the frame may be adjusted instead of inserting the dummy data so that two bits on the MSB side of the CRC data is not set to "11" before transmission of the frame. Alternatively, the dummy data may be inserted only when the two bits on the MSB side of the CRC data are set to "11".

As mentioned above, in the present embodiment, the controller (signal generating circuit 6) is configured, while the preamble includes the slots of which the number (twelve in the illustrated example) is equal to a product of four and an integer of three or more, to decrease the light quantity in the slots (second slots) of which the number is equal to the integer of three or more (three in the illustrated example), to increase the light quantity in seven or more slots continuously, and not to decrease the light quantity in four or more slots continuously. Accordingly, disturbance of the waveform of the current that flows through the LED source 3 can be suppressed while suppressing a cost rise and the like.

The visible light communication system according to the present embodiment described above includes the transmitter 10 and the receiver 20. The visible light communication system is configured to transmit the optical-communication signal from the transmitter 10 to the receiver 20 with visible light as a communication medium. The transmitter 10 includes: the light source (LED source 3) configured to emit the visible light; a lighting circuit (constant current source 1, smoothing capacitor 2) configured to supply electric power to the light source to turn on the light source; and a controller (load change element 4, switch element 5, signal generating circuit 6) configured to control the lighting circuit to increase/decrease the light quantity of the visible light to be emitted by the light source. The controller is configured, by decreasing the light quantity in only the first slot that is any one of the plurality of slots into which the unit time is divided equally, and increasing the light quantity in all the remaining slots except the first slot of the plurality of slots, to assign the information to the first slot of the plurality of slots. The controller is furthermore configured to decrease the light quantity in the second slots that are three or more continuous slots starting from the head of the preamble, which indicates the frame start point, of the frame of the optical-communication signal and to increase the light quantity in the slot immediately before the preamble.

As with the visible light communication system according to the present embodiment, the unit time is preferably a time period of the one symbol including two bits in the data part except the preamble of the frame. The plurality of slots preferably includes the four slots into which the time period of the one symbol is divided equally. The controller is preferably configured to assign the two-bit data to the first slot of the four slots in which the time period of the one symbol is divided equally. Preferably, the controller is furthermore configured, while the preamble includes slots of which the number is equal to a product of four and an integer of three or more, to decrease the light quantity in the second slots of which the number is equal to the integer of three or more, to increase the light quantity in seven or more slots continuously, and not to set four or more of the second slots continuously.

Second Embodiment

The present embodiment has a characteristic in a composition of a preamble in an optical-communication signal. Compositions of a transmitter 10 and the like are the same as those of the conventional example, and then display and description of the detailed compositions thereof will be omitted.

A controller (signal generating circuit 6) of the present embodiment is configured to constitute the preamble with a pattern that fulfills the following four conditions (refer to FIG. 3).

1. The number of slots of the preamble is twelve (the same as the first embodiment and the conventional example).
2. Only three slots of twelve slots are assigned with "1" (prevention from a flicker of illumination light).
3. At least seven continuous slots are assigned with "0" (it does not generate in a 4 PPM signal).
4. Three or more slots that are assigned with "1" are not continued.

The "prevention from a flicker of illumination light" that is the object of the second condition means that the change (flicker) of the luminosity of the illumination light can be prevented by the preamble being also constituted at the same ratio as the 4 PPM signal since only one slot of the four slots assigned with "1" in the 4 PPM signal.

As mentioned above, in the present embodiment, the controller (signal generating circuit 6) is configured, while the preamble includes the slots of which the number (12) is equal to a product of four and an integer of three or more, to decrease the light quantity in the slots (second slots) of which the number (3) is equal to the integer of three or more, to increase the light quantity in seven or more slots continuously, and not to decrease the light quantity in three or more slots continuously. Accordingly, disturbance of a waveform of a current that flows through the LED source 3 can be suppressed in addition to suppression of a cost rise and the like. Although being set to 12 (=3×4) in the present embodiment, the number of slots of the preamble may be set to the number of slots that fulfills the first condition like 16 (=4×4) and 20 (=5×4).

The visible light communication system according to the present embodiment described above includes the transmitter 10 and a receiver 20. The visible light communication system is configured to transmit an optical-communication signal from the transmitter 10 to the receiver 20 with visible light as a communication medium. The transmitter 10 includes: a light source (LED light source 3) configured to emit the visible light; a lighting circuit (constant current source 1, smoothing capacitor 2) configured to supply electric power to the light source to turn on the light source; and the controller (load change element 4, switch element 5, signal generating circuit 6) configured to control the lighting circuit to increase/decrease the light quantity of the visible light to be emitted by the light source. The controller is configured, by decreasing the light quantity in only a first slot that is any one of the plurality of slots into which a unit time is divided equally, and increasing the light quantity in all the remaining slots except the first slot of the plurality of slots, to assign information to the first slot of the plurality of slots. The controller is configured to assign two-bit data to the first slot of the four slots into which a time period of one symbol is divided equally, in the data part except the preamble, which indicates a frame start point, of a frame of the optical-communication signal. The four slots are the plurality of slots. The one symbol includes two bits. The controller is furthermore configured, while the preamble includes the slots of which the number is equal to a product of four and an integer of three or more, to decrease the light quantity in the second slots of which the number is equal to the integer of three or more, to increase the light quantity in the seven or more slots continuously, and not to set three or more of the second slots continuously.

Third Embodiment

The present embodiment has a characteristic in a composition of a preamble in an optical-communication signal. Compositions of a transmitter 10 and the like are the same as those of the conventional example, and then display and description of the detailed compositions thereof will be omitted.

Figures 4, 5, 6:
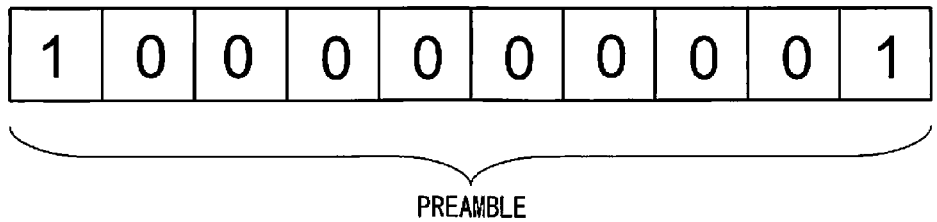
FIG. 4 is an explanatory view for a preamble of a visible light communication system according to a third embodiment of the present invention.
FIG. 5 is an explanatory view for a 4 PPM-S0 coding of the visible light communication system according to the third embodiment of the present invention.
FIG. 6 is an explanatory view for the preamble of the visible communication system according to the third embodiment of the present invention.

A controller (signal generating circuit 6) of the present embodiment is configured to assign two-bit data to a position of one slot, in which the light quantity is decreased, of five slots into which a time period of one symbol is divided equally in a data part except the preamble (refer to FIG. 5). The one symbol includes two bits. Hereinafter, the coding mode in the present embodiment is called a 4 PPM-S0 coding.

The controller (signal generating circuit 6) of the present embodiment furthermore constitutes the preamble with a pattern that fulfills the following four conditions (refer to FIG. 4).

1. The number of slots of the preamble is ten (prevention from a flicker of illumination light).
2. Only two slots of ten slots are assigned with "1" (prevention from a flicker of illumination light).
3. At least eight continuous slots are assigned with "0" (it does not generate in a 4 PPM-S0 signal).
4. Slots that are assigned with "1" are not continued.

The "prevention from a flicker of illumination light" that is the object of the first and second conditions means that the change (flicker) of the luminosity of the illumination light can be prevented by the preamble being also constituted at the same ratio as the 4 PPM-S0 signal since only one slot of the five slots is assigned with "1" in the 4 PPM-S0 signal.

As mentioned above, in the present embodiment, the controller (signal generating circuit 6) is configured, while the preamble includes the slots of which the number (ten in the illustrated example) is equal to a product of five and an integer of two or more (two in the illustrated example), to decrease the light quantity in slots (second slots) of which the number is equal to the integer of two or more (2), to increase the light quantity in eight or more slots continuously, and not to decrease the light quantity in slots continuously. Accordingly, disturbance of a waveform of a current that flows through an LED source 3 can be suppressed in addition to suppression of a cost rise and the like.

The visible light communication system according to the present embodiment includes the transmitter 10 and a receiver 20. The visible light communication system is configured to transmit an optical-communication signal from the transmitter 10 to the receiver 20 with visible light as a communication medium. The transmitter 10 includes: a light source (LED light source 3) configured to emit the visible light; a lighting circuit (constant current source 1, smoothing capacitor 2) configured to supply electric power to the light source to turn on the light source; and a controller (load change element 4, switch element 5, signal generating circuit 6) configured to control the lighting circuit to increase/decrease the light quantity of the visible light to be emitted by the light source. The controller is configured, by decreasing the light quantity in only a first slot that is any one of the plurality of slots into which a unit time is divided equally, and increasing the light quantity in all the remaining slots except the first slot of the plurality of slots, to assign information to the first slot of the plurality of slots. The controller is configured to assign two-bit data to the first slot of the four slots except a head slot or a tail slot of the five slots into which a time period of one symbol is divided equally, in a data part except the preamble, which indicates a frame start point, of a frame of the optical-communication signal. The five slots are the plurality of slots. The one symbol includes two bits. The controller is furthermore configured, while the preamble includes the slots of which the number is equal to a product of five and an integer of two or more, to decrease the light quantity in second slots of which the number is equal to the integer of two or more, to increase the light quantity in the eight or more slots continuously, and not to set three or more of the second slots continuously.

Although the number of slots of the preamble is set to 10 (=2×5) in the present embodiment, the number of slots may be set to 15 (=3×5) or the like as shown in FIG. 6. Even if two slots that are assigned with "1" are continued, the disturbance of the waveform of the current can be suppressed.

The visible light communication system according to the present example includes the transmitter 10 and the receiver 20. The visible light communication system is configured to transmit the optical-communication signal from the transmitter 10 to the receiver 20 with the visible light as the communication medium. The transmitter 10 includes: the light source (LED light source 3) configured to emit the visible light; the lighting circuit (constant current source 1, smoothing capacitor 2) configured to supply electric power to the light source to turn on the light source; and the controller (load change element 4, switch element 5, signal generating circuit 6) configured to control the lighting circuit to increase/decrease the light quantity of the visible light to be emitted by the light source. The controller is configured, by decreasing the light quantity in only the first slot that is any one of the plurality of slots into which the unit time is divided equally, and increasing the light quantity in all the remaining slots except the first slot of the plurality of slots, to assign the information to the first slot of the plurality of slots. The controller is configured to assign two-bit data to the first slot of the four slots except the head slot or the tail slot of the five slots into which the time period of the one symbol is divided equally, in the data part except the preamble, which indicates the frame start point, of the frame of the optical-communication signal. The five slots are the plurality of slots. The one symbol includes two bits. The controller is furthermore configured, while the preamble includes the slots of which the number is equal to a product of five and an integer of two or more, to decrease the light quantity in the second slots of which the number is equal to the integer of two or more, to increase the light quantity in the eight or more slots continuously, and not set the second slots continuously.

The invention claimed is:

1. A visible light communication system comprising a transmitter and a receiver, the visible light communication system being configured to transmit an optical-communication signal from the transmitter to the receiver with visible light as a communication medium,
the transmitter comprising:
a light source configured to emit the visible light;
a lighting circuit configured to supply electric power to the light source to turn on the light source; and
a controller configured to control the lighting circuit to increase/decrease light quantity of the visible light to be emitted by the light source,
the controller configured, by decreasing the light quantity in only a slot that is any one of a plurality of slots into which a unit time is divided equally, and increasing the light quantity in all remaining slots of the plurality of slots, to assign information to a position of the slot in which the light quantity is decreased, of the plurality of slots, and
the controller furthermore configured to decrease the light quantity in slots that are three or more continuous slots starting from a head of a preamble, which indicates a frame start point, of a frame of the optical-communication signal and to increase the light quantity in a slot immediately before the preamble.

2. The visible light communication system according to claim 1,
wherein the unit time is a time period of one symbol comprising two bits in a data part except the preamble of the frame,
wherein the plurality of slots comprises four slots into which the time period of the one symbol is divided equally,
wherein the controller is configured to assign two-bit data to a position of the slot in which the light quantity is decreased, of the four slots, and
wherein the controller is furthermore configured, while the preamble comprises slots of which a number is equal to a product of four and an integer of three or more, to decrease the light quantity in the second slots of which a number is equal to the integer of three or more, to increase the light quantity in seven or more slots continuously, and not to set four or more of the second slots continuously.

3. A visible light communication system comprising a transmitter and a receiver, the visible light communication system being configured to transmit an optical-communication signal from the transmitter to the receiver with visible light as a communication medium,
the transmitter comprising:
a light source configured to emit the visible light;
a lighting circuit configured to supply electric power to the light source to turn on the light source; and
a controller configured to control the lighting circuit to increase/decrease light quantity of the visible light to be emitted by the light source,
the controller configured, by decreasing the light quantity in only a slot that is any one of a plurality of slots into which a unit time is divided equally, and increasing the light quantity in all remaining slots of the plurality of slots, to assign information to a position of the slot in which the light quantity is decreased, of the plurality of slots,
the controller configured to assign two-bit data to the position of the slot of four slots into which a time period of one symbol is divided equally, in a data part except a preamble, which indicates a frame start point, of a frame of the optical-communication signal, the four slots being the plurality of slots, the one symbol comprising two bits, and
the controller furthermore configured, while the preamble comprises slots of which a number is equal to a product of four and an integer of three or more, to decrease the light quantity in slots of which a number is equal to the integer of three or more, to increase the light quantity in seven or more slots continuously, and not to set three or more of the slots in which the light quantity is decreased, continuously.

4. A visible light communication system comprising a transmitter and a receiver, the visible light communication system being configured to transmit an optical-communication signal from the transmitter to the receiver with visible light as a communication medium,
the transmitter comprising:
a light source configured to emit the visible light;

a lighting circuit configured to supply electric power to the light source to turn on the light source; and a controller configured to control the lighting circuit to increase/decrease light quantity of the visible light to be emitted by the light source, the controller configured, by decreasing the light quantity in only a slot that is any one of a plurality of slots into which a unit time is divided equally, and increasing the light quantity in all remaining slots of the plurality of slots, to assign information to a position of the slot in which the light quantity is decreased, of the plurality of slots, the controller configured to assign two-bit data to the position of the slot of four slots except a head slot or a tail slot of five slots into which a time period of one symbol is divided equally, in a data part except a preamble, which indicates a frame start point, of a frame of the optical-communication signal, the five slots being the plurality of slots, the one symbol comprising two bits, and the controller furthermore configured, while the preamble comprises slots of which a number is equal to a product of five and an integer of two or more, to decrease the light quantity in slots of which a number is equal to the integer of two or more, to increase the light quantity in eight or more slots continuously, and not to set three or more of the slots in which the light quantity is decreased, continuously.

5. A visible light communication system comprising a transmitter and a receiver, the visible light communication system being configured to transmit an optical-communication signal from the transmitter to the receiver with visible light as a communication medium, the transmitter comprising:

a light source configured to emit the visible light;

a lighting circuit configured to supply electric power to the light source to turn on the light source; and a controller configured to control the lighting circuit to increase/decrease light quantity of the visible light to be emitted by the light source, the controller configured, by decreasing the light quantity in only a slot that is any one of a plurality of slots into which a unit time is divided equally, and increasing the light quantity in all remaining slots of the plurality of slots, to assign information to a position of the slot in which the light quantity is decreased, of the plurality of slots, the controller configured to assign two-bit data to the position of the slot of four slots except a head slot or a tail slot of five slots into which a time period of one symbol is divided equally, in a data part except a preamble, which indicates a frame start point, of a frame of the optical-communication signal, the five slots being the plurality of slots, the one symbol comprising two bits, and the controller furthermore configured, while the preamble comprises slots of which a number is equal to a product of five and an integer of two or more, to decrease the light quantity in slots of which a number is equal to the integer of two or more, to increase the light quantity in eight or more slots continuously, and not set the slots in which the light quantity is decreased, continuously.

\* \* \* \* \*